(12) United States Patent
Zhao et al.

US011280605B2

(10) Patent No.: US 11,280,605 B2
(45) Date of Patent: *Mar. 22, 2022

(54) THREE-DIMENSIONAL MEASURING SYSTEM AND MEASURING METHOD WITH MULTIPLE MEASURING MODES

(71) Applicant: Shining 3D Tech Co., Ltd., Zhejiang (CN)

(72) Inventors: Xiaobo Zhao, Zhejiang (CN); Wenbin Wang, Zhejiang (CN); Zi Ye, Zhejiang (CN); Chongmao Ye, Zhejiang (CN); Jian Zhang, Zhejiang (CN); Leijie Huang, Zhejiang (CN); Xiaoping Xiang, Zhejiang (CN)

(73) Assignee: SHINING 3D TECH CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,466

(22) Filed: Jun. 5, 2019

(65) Prior Publication Data

US 2019/0293412 A1 Sep. 26, 2019

Related U.S. Application Data

(63) Continuation of application No. 15/833,950, filed on Dec. 6, 2017, now Pat. No. 10,317,199, which is a (Continued)

(30) Foreign Application Priority Data

Apr. 8, 2016 (CN) .......................... 201610220338.7
Jul. 20, 2016 (CN) .......................... 201610584281.9

(51) Int. Cl.
*G01B 11/25* (2006.01)
*G06T 7/70* (2017.01)
*H04N 5/225* (2006.01)

(52) U.S. Cl.
CPC .......... *G01B 11/25* (2013.01); *G01B 11/2513* (2013.01); *G06T 7/70* (2017.01); *H04N 5/2256* (2013.01)

(58) Field of Classification Search
CPC ....... G01B 11/25; G01B 11/2513; G06T 7/70; H04N 5/2256
See application file for complete search history.

(56) References Cited

U.S. PATENT DOCUMENTS 8,937,657 B2    1/2015  Klass
10,317,199 B2   6/2019  Zhao et al.
(Continued)

FOREIGN PATENT DOCUMENTS

CN       1483999 A     3/2004
CN     101189487 A     5/2008
(Continued)

OTHER PUBLICATIONS

Curless et al., "A Volumetric Method for Building Complex Models from Range Images," SIGGRAPH '96 Proceedings of the 23rd annual conference on Computer graphics and interactive techniques, 10 pages.

(Continued)

*Primary Examiner* — Farzana Hossain
(74) *Attorney, Agent, or Firm* — Mauriel Kapouytian Woods LLP; Liang Huang; Michael Mauriel

(57) ABSTRACT

The present invention relates to the field of three-dimensional digital imaging, and more particularly to a three-dimensional measuring system and a measuring method with multiple measuring modes. The measuring system includes a control unit, a variable digital pattern generation unit, an image processing unit, a calculating unit and at least one image sensor; the control unit is used for controlling the cooperative work of the whole measuring system; the vari- (Continued)

able digital pattern generation unit includes a memory and a projector, and the memory stores a plurality of light template digital patterns; the image sensors are used for acquiring patterns which are projected onto a surface of a measured object; the image processing unit is a multi-mode digital image processor; and the calculating unit is a multi-mode three-dimensional point cloud calculator. The three-dimensional measuring system and the measuring method with multiple measuring modes of the present invention can implement the high-precision and high-detail three-dimensional measurement or handheld real-time measurement by switching the measuring modes, thereby having a wide application range.

14 Claims, 2 Drawing Sheets

Related U.S. Application Data continuation of application No. 15/560,155, filed as application No. PCT/CN2016/091913 on Jul. 27, 2016, now abandoned.

(56) References Cited

U.S. PATENT DOCUMENTS

| | | | | |
|---|---|---|---|---|
| 2013/0004060 A1* | 1/2013 | Bell | ..................... | H04N 13/257 |
| | | | | 382/154 |
| 2014/0015963 A1* | 1/2014 | Klaas | ................ | G01N 21/8806 |
| | | | | 348/136 |
| 2015/0153164 A1 | 6/2015 | Klass | | |
| 2015/0178412 A1* | 6/2015 | Grau | ..................... | G01B 5/004 |
| | | | | 703/1 |
| 2017/0039756 A1 | 2/2017 | Moule et al. | | |

FOREIGN PATENT DOCUMENTS

| | | |
|---|---|---|
| CN | 102112845 A | 6/2011 |
| CN | 104299211 A | 1/2015 |
| CN | 104487800 A | 4/2015 |

OTHER PUBLICATIONS

Rusinkiewicz et al., "Efficient Variants of the ICP Algorithm," Third International Conference on 3-D Digital Imaging and Modeling, 2001, 8 pages.

Newcombe et al., "KinectFusion: Real-Time Dense Surface Mapping and Tracking," 10th IEEE International Symposium on Mixed and Augmented Reality (ISMAR), 2011, 10 pages.

Izadi et al., "KinectFusion: Real-time 3D Reconstruction and Interaction Using a Moving Depth Camera," UIST '11 Proceedings of the 24th annual ACM symposium on User interface software and technology, 10 pages.

Petrelli et al., "On the repeatability of the local reference frame for partial shape matching," 2011 IEEE International Conference on Computer Vision (ICCV), 8 pages.

Kim et al., "Simultaneous registration of multiple views with markers," Computer-Aided Design, vol. 41, Issue 4, 2009, pp. 231-239.

* cited by examiner

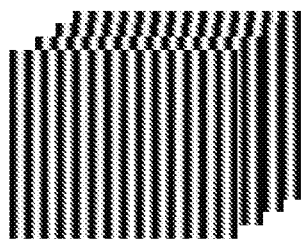
Figure 3
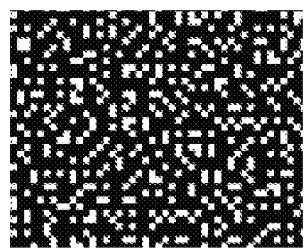
Figure 4
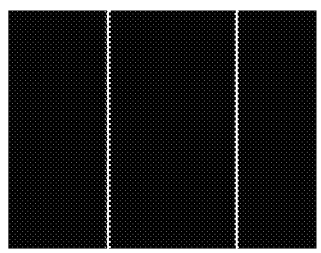
Figure 5
| | | -0.8 | -0.3 | 0 | 0.5 | 1.0 | | | |
|---|---|---|---|---|---|---|---|---|---|
| | | | -0.6 | -0.1 | 0.4 | 0.9 | | | |
| | | | -0.8 | -0.3 | 0.2 | 0.7 | | | |
| | | | -1.0 | -0.5 | 0 | 0.5 | 1.0 | | |
| | | | | -0.6 | -0.1 | 0.4 | 0.9 | | |
| | | | | -0.6 | -0.2 | 0.4 | 0.9 | | |
| | | | | -0.7 | -0.2 | 0.3 | 0.7 | | |
| | | | | -0.7 | -0.2 | 0.3 | 0.7 | | |
| | | | | -0.8 | -0.3 | 0.3 | 0.7 | | |
| | | | | -0.8 | -0.3 | 0.3 | 0.7 | | |
Figure 6

THREE-DIMENSIONAL MEASURING SYSTEM AND MEASURING METHOD WITH MULTIPLE MEASURING MODES

CROSS REFERENCE TO RELATED APPLICATIONS

The present application is a continuation of U.S. application Ser. No. 15/833,950, which is a continuation of U.S. application Ser. No. 15/560,155, which is a U.S. National Phase application under 35 USC § 371 of International Application No. PCT/CN2016/091913 filed 27 Jul. 2016 which claims priority from Chinese Patent Application No. CN2016102203387 filed 8 Apr. 2016 and CN2016105842819 filed 20 Jul. 2016. The contents of each of these applications are hereby incorporated by reference in their entirety.

BACKGROUND

Technical Field

The present invention relates to the field of three-dimensional digital imaging and modeling, and more particularly to a three-dimensional measuring system and measuring method with multiple measuring modes.

Related Art

The non-contact three-dimensional measuring technology for a surface of an object has already been widely used in various fields such as industry, medical treatment, art, education, etc. The application in different fields has different requirements on three-dimensional measurement. For example, the automotive industry requires the data precision of the three-dimensional measurement to be high and the data detail to be clear; the human body three-dimensional measurement requires to rapidly acquire the three-dimensional data of the human body and requires a measuring system to have a handheld function, and the requirement on the precision is relatively low; and the three-dimensional measurement for a large-sized sculpture requires the measuring system to have a handheld function, requires the data precision to be relatively high, and requires the data to have more details.

The existing known three-dimensional scanner and a measuring method thereof cannot well integrate the functions meeting the aforementioned requirements in one three-dimensional measuring system. For example, the Chinese invention patent No. CN1483999A discloses a method and system for measuring a three-dimensional surface contour of an object, and the three-dimensional measuring system encoding light and phase shift is used to realize the high-precision three-dimensional measurement. However, the method and the system utilize multiple pictures to carry out the three-dimensional rebuilding, so the handheld function cannot be realized. In addition, both a three-dimensional scanning and automatic reference system and device disclosed in the invention patent No. CN101189487 B and a system for self-adaptively three-dimensionally scanning surface characteristics disclosed in the invention patent No. CN102112845 B have mentioned a handheld three-dimensional scanner. However, the foregoing device cannot realize the high-detail and high-precision three-dimensional measurement, and a projection pattern cannot be remotely updated. Furthermore, the foregoing measurement of multiple modes is independently carried out, the measured data cannot be processed, fused and optimized, which is only equivalent to that several measuring modes are just simply integrated into a device. In this case, the use of multiple measuring modes is not beneficial to the optimization of a measurement result.

SUMMARY

The present invention aims at solving the technical problem of providing a three-dimensional measuring system with multiple measuring modes, which not only may adopt a fixed measuring mode of multiple structured light patterns to realize the high-precision and high-detail three-dimensional measurement for a surface of an object, but also can adopt a handheld measuring mode of a single picture to realize the rapid and real-time handheld three-dimensional measurement for the surface of the object by switching the measuring modes.

In order to achieve the above-mentioned objectives, the present invention adopts a technical solution as follows.

A three-dimensional measuring system with multiple measuring modes includes a control unit, a variable digital pattern generation unit, an image processing unit, a calculating unit and at least one image sensor, wherein the control unit is respectively connected with the variable digital pattern generation unit, the image processing unit, the calculating unit and the image sensor, and is used for controlling the cooperative work of the whole measuring system;

the variable digital pattern generation unit includes a memory and a projector, the memory stores a plurality of light template digital patterns, the projector is a digital projector and is used for projecting the digital patterns in the memory onto a surface of a measured object;

the image sensor is used for acquiring the patterns which are projected by the projector onto the surface of the measured object;

the image processing unit is a multi-mode digital image processor having multiple image processing modes, and is used for extracting the patterns, acquired by the image sensor, of the surface of the measured object according to a selected image processing mode to obtain two-dimensional characteristics of the surface of the measured object; and the calculating unit is a multi-mode three-dimensional point cloud calculator having multiple three-dimensional point cloud calculating modes, and is used for searching corresponding points and three-dimensionally rebuilding the two-dimensional characteristics processed by the image processing unit according to a selected three-dimensional cloud calculating mode to obtain three-dimensional data of the surface of the measured object.

Preferably, the light template digital patterns stored in the memory include, but not limited to, sinusoidal fringes, digital speckle patterns and multi-parallel-line patterns.

Further, the three-dimensional measuring system with multiple measuring modes also includes a human-machine interaction unit, wherein the human-machine interaction unit is connected with the control unit, and is used for selecting the light template digital pattern, the image processing mode and the three-dimensional point cloud calculating mode and for displaying a measuring result.

Further, the three-dimensional measuring system also includes a communication unit, wherein the communication unit is connected with the control unit, and is used for being communicated with an external terminal.

Further, a communication content between the communication unit and the external terminal includes: outputting the three-dimensional data of the surface of the measured object obtained by the calculating unit, and inputting the updated or added light template digital patterns, an image processing algorithm and a three-dimensional point cloud calculating algorithm.

Further, the three-dimensional measuring system is a handheld measuring device.

Preferably, the handheld measuring device includes a main body, a projector disposed at the center of a front portion of the main body, image sensors symmetrically disposed at two sides of the projector, and a control unit, a memory, an image processing unit and a calculating unit, which are disposed in the main body, wherein the rear portion of the main body is provided with a handle or a handheld portion.

The memory on the variable digital pattern generation unit of the three-dimensional measuring system with multiple measuring modes of the present invention stores multiple light template digital patterns, the patterns are projected onto the surface of the measured object through the digital projector, and then the corresponding patterns are acquired by the image sensors, and are processed by the multi-mode digital image processor and the multi-mode three-dimensional point calculator to obtain the measured data at multiple measuring modes. By switching the measuring modes, not only can the fixed measuring mode of multiple structured light patterns be used to realize the high-precision and high-detail three-dimensional measurement for the surface of the object such as an industrial component, etc., but also the handheld measuring mode of a single picture can be used to realize the rapid and real-time handheld three-dimensional measurement for the surface of the object such as the human body, a sculpture, etc. Therefore, the high-precision and high-detail three-dimensional measurement or the handheld real-time measurement for the surfaces of different measured objects can be implemented according to the requirement of a user, and the application range is wide.

On the other hand, the three-dimensional measuring system of the present invention can input the updated or added light template digital patterns, the image processing algorithm and the three-dimensional point cloud calculating algorithm through the communication unit, thereby further meeting the requirements of the user at different periods of time, decreasing the upgrading cost of the device, and having good economic benefit.

The present invention also provides a three-dimensional measuring method with multiple measuring modes, the method being used for the data processing of the aforementioned three-dimensional measuring system with multiple measuring modes, thereby implementing the high-detail and high-precision three-dimensional measurement.

Specifically, the three-dimensional measuring method with multiple measuring modes includes the following steps:

S1, a uniform data structural model is established, the uniform data structural model being used for uniformly expressing measured data obtained at multiple measuring modes;

S2, at a single measuring mode, each piece of point cloud obtained by measurement is expressed by using a uniform data structure, and is calculated and preprocessed;

S3, the data obtained at different measuring modes is merged, and two pieces of point clouds at any positions are aligned to a uniform coordinate system; and S4, the merged data is subject to hybrid global optimization to obtain a measuring result.

Further, in step S1, the multiple measuring modes include: a sinusoidal fringe measuring mode, a digital speckle pattern measuring mode and a multi-parallel-line pattern measuring mode.

Further, step S1 specifically includes:

the measured data obtained at multiple measuring modes is expressed by using a continuous implicit function $D(x)$, wherein $x \in R^3$ indicates a position in a three-dimensional space, $D(x)$ indicates a shortest distance from x to the surface of a measured object, and a continuous curved surface indicates by $D(x)=0$ is the surface of the object, obtained by measurement.

Further, in step S2, the calculating and the preprocessing specifically include:

S21, a boundingbox G surrounding a measured area is used as a feasible domain of $D(x)$, and the boundingbox G is uniformly partitioned into small cubes $g_i$ of the same size;

S22, for each point $(P_j, N_j)$ in the point cloud obtained by measurement, the small cube $g_{Pj}$ where the $P_j$ is placed is found, wherein $P_j$ is the three-dimensional coordinate of the point, and $N_j$ is the normal vector of the point;

S23, for each cube $g_{Pj}$ and $n^3$ cubes $g_i$ that are centered on $g_{Pj}$, a distance value $D(x_i)$ and a confidence weight $W(x_i)$ of the distance value are respectively calculated;

$$D(x_i) = N_j \cdot (x_i - P_j) \qquad (1)$$

$$W(x_i) = \frac{d_g}{0.1 * d_g + \|x_i - P_j\|^2} \qquad (2)$$

wherein $1 < n \le 10$, $x_i$ indicates a central point of $g_{Pj}$ and $g_i$ anticipating in the calculating, $D(x_i)$ indicates a signed shortest distance from $x_i$ to the surface of the measured object, and is a positive value when being outside the object, and a negative value when being inside the object, $W(x_i)$ indicates a confidence level of $D(x_i)$, and $d_g$ is an edge length of $g_i$; and S24, a marching cube method is used for obtaining point cloud and mesh results.

Further, the calculating and the preprocessing also include:

S25, if a point in the multiple pieces of the point clouds obtained by measurement repeatedly falls in the same $g_i$, the distance value $D(x_i)$ and the confidence weight $W(x_i)$ of the distance value are successively calculated:

$$D^*(x_i) = \frac{W(x_i) * D(x_i) + w(x_i) * d(x_i)}{W(x_i) + w(x_i)} \qquad (3)$$

$$W^*(x_i) = W(x_i) + w(x_i) \qquad (4)$$

wherein $D(x_i)$ indicates a distance value before being updated, $W(x_i)$ is the confidence weight before being updated, $d(x_i)$ indicates a distance value obtained by latest calculation, $w(x_i)$ indicates the confidence weight obtained by latest calculation, $D^*(x_i)$ indicates the updated distance value, and $W^*(x_i)$ indicates the updated confidence weight; and thereafter, the marching cube method is used for obtaining the point clouds and the mesh results.

Further, the calculating and the preprocessing also include:

S26, if the point in the multiple pieces of the point clouds obtained by measurement repeatedly falls in the same $g_i$, the distance value D($x_i$) and the confidence weight W($x_i$) of the distance value are successively calculated, and after the measurement is ended, for each $g_i$, a weighted average method is used to obtain a final $D_f(x_i)$ and $W_f(x_i)$:

$$D_f(x_i) = \frac{\Sigma W_j(x_i) * D_j(X_i)}{\Sigma W_j(x_i)} \quad (5)$$

$$W_f(x_i) = \sum W_j(x_i) \quad (6)$$

wherein $D_j(x_i)$ and $W_j(x_i)$ are values obtained by calculating when the point in the multiple pieces of point cloud repeatedly falling in the same $g_i$ at the $j^{th}$ time; and then, the marching cube method is used to obtain the point clouds and the mesh results.

Further, when the measuring mode is the multi-parallel-line measuring mode, the measured data obtained in the measuring process is not calculated and updated in real time, and is only displayed in a sampling way so as to instruct the user to measure; and after the measurement is ended, all point clouds obtained by measurement are arranged at a uniform global coordinate system, then the normal vectors of all the point clouds are calculated, and then the distance value D($x_i$) and the confidence weight W($x_i$) of the distance value are uniformly calculated.

Further, when the normal vector of all point clouds is calculated, the normal vector of each point is analyzed and calculated by using principal component analysis (PCA) method, and the following formula is specifically used:

$$C(p) = \frac{\Sigma q_i}{N} \quad (7)$$

$$M(p) = \sum (q_i - C(p)) \cdot (q_i - C(p))^T \quad (8)$$

wherein p is a point of the normal vector to be calculated, $q_i$ is a point of a specific neighborhood of p, M(p) is a covariance matrix, and an eigenvector corresponding to a minimum eigenvalue is the normal vector of p; and the direction of the normal factor facing a camera is determined as the direction of the normal vector.

Further, in step S3, aligning the data obtained at different measuring modes include rough aligning and precise aligning, wherein the rough aligning method includes manual selection aligning, mark point-based aligning and feature-based aligning, and the precise merging method includes an iterative closest point (ICP) method.

Further, the step S4 specifically includes:

S41, corresponding points of the point cloud and a mark point are searched between two frames of the measured data;

S42, an error minimization formula is used to obtain a rigid variation matrix of each frame of point cloud;

S43, the rigid variation matrix is multiplied by each frame of point cloud, and such a process is iterated until convergence.

Further, in the step S42, the used error formula is as follows:

$$\text{Error}(RT) = \Sigma_{\text{any two point clouds}(i,j)} (w_{i,j}^1 \Sigma_k \|n_k^T(RT_i * p_k - RT_j * q_k)\|^2 + w_{i,j}^2 \Sigma_k \|RT_i * P_k - RT_j * Q_k\|^2) \quad (9)$$

wherein ($p_k$, $q_k$) is a corresponding point of (i, j), ($P_k$, $Q_k$) is a corresponding mark point of (i, j), $n_k$ is a normal vector of $q_k$, $RT_i$ is the rigid transformation matrix of the $i^{th}$ piece of point cloud, RT is the rigid transformation matrix of all point clouds, and $w_{i,j}^1$ and $w_{i,j}^2$ respectively are weights of the point cloud corresponding point and the mark point corresponding point.

Further, when there is one frame of multi-parallel-line measured data in i,j, set $w_{i,j}^1 = 0$.

The three-dimensional measuring method with multiple measuring modes uses the continuous implicit function D(x) to perform the uniform data structural management and expression for the data measured at multiple measuring modes, thereby achieving an objective of switching different measuring modes. Meanwhile, the cube is used to surround the measuring area of the user, and the cube is uniformly partitioned to realize discrete expression of D(x) to serve as foundation of the subsequent data processing. The three-dimensional measuring method with multiple measuring modes of the present invention realizes the real-time fusion of the measured data at multiple measuring modes, and realizes the high-detail and high-precision three-dimensional measurement.

In real application, the user can conveniently and rapidly complete the measurement task by combining the multiple measuring modes. For example, when a sculpture with a height equal to a person is measured, the digital speckle measuring mode can be used for the face portion to rapidly acquire data; the multi-parallel-line measuring mode can be used for characters, creased clothing, ornaments and the like to rapidly acquire high-precision data, and the sinusoidal fringe measuring mode can be used for an independent sculpture part of a small size (less than 15 cm), such as a teapot, a tea cup and the like to obtain high-precision three-dimensional data.

BRIEF DESCRIPTION OF THE DRAWINGS

FIG. 3 is a schematic diagram illustrating a sinusoidal fringe sequence pattern.

FIG. 4 is a schematic diagram illustrating a digital speckle pattern.

FIG. 5 is a schematic diagram illustrating a parallel-line pattern.

FIG. 6 is a schematic diagram illustrating discretization expression of a three-dimensional measuring method with multiple measuring modes according to D(x) the present invention.

Figure 1:
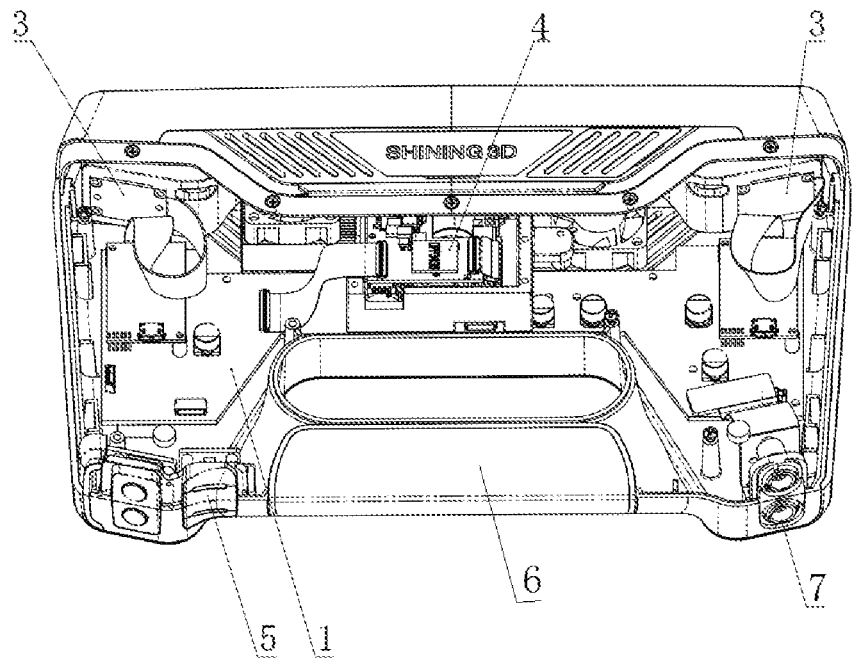
FIG. 1 is a structural schematic diagram illustrating a specific embodiment of a three-dimensional measuring system with multiple measuring modes according to the present invention.

Instruction of reference numbers in the drawings: 1—circuit board, 2—digital pattern projector, 3—image sensor, 4—digital pattern memory, 5—measurement triggering key, 6—handle, 7—data transmission interface.

DETAILED DESCRIPTION

In order to further understand the present invention, preferred embodiments of the present invention are described below in conjunction with embodiments, but it should be understood that the descriptions are only to further explain the characteristics and advantages of the present invention, but not to limit claims of the present invention.

A three-dimensional measuring system with multiple measuring modes for acquiring three-dimensional data of a surface of an object includes a variable digital pattern generation unit, two or more than two image sensors, a controller, a multi-mode digital image processor, and a multi-mode three-dimensional point cloud calculator.

The controller is used for controlling the cooperative work of a digital projecting apparatus, the image sensors, the image processor and the three-dimensional point cloud calculator, receiving three-dimensional point cloud data and displaying, editing and storing the three-dimensional point cloud data.

The variable digital pattern generation unit includes a digital patter memory and a digital pattern projector. Various digital patterns are previously stored into the digital pattern memory, the digital pattern projector projects the patterns in the digital pattern memory onto the surface of the object to serve as characteristics for rebuilding object three-dimensional data. Various light template patterns capable of being projected include, but not limited to, sinusoidal fringes, digital speckle patterns, multi-parallel-line patterns and other projection patterns.

The image sensor acquires the patterns projected by the digital projecting apparatus onto the surface of the object.

The multi-mode digital image processor has multiple image processing modes, and extracts the patterns, acquired by the image sensors, of the surface of the object according to a selected image processing mode to obtain two-dimensional characteristics of the surface of the object.

The multi-mode three-dimensional point cloud calculator has multiple three-dimensional point cloud calculating modes, and performs corresponding point searching and three-dimensional reconstruction for the two-dimensional characteristics processed by the image processor according to a selected three-dimensional point cloud calculating mode, so as to obtain three-dimensional data of the object surface.

For convenience in real use, the measuring system of the present invention may also be provided with a human-machine interaction unit and a communication unit.

The human-machine interaction unit is a ICD touch-sensitive screen, is connected with the controller, and is used for selecting one light template digital pattern, one image processing mode and one three-dimensional point cloud calculating mode and displaying a measuring result. The communication unit includes a wireless communication module and a communication interface, and is used for being communicated with an external terminal. The communication content includes: outputting three-dimensional data of the surface of the measured object, obtained by the multi-mode three-dimensional point cloud calculator, and inputting the updated or added light template digital pattern, the image processing algorithm and the three-dimensional point cloud calculating algorithm.

When the three-dimensional measuring system in the present embodiment works, a user selects one measuring mode, the controller transmits a command to the digital pattern memory according to the measuring mode to inform the digital pattern memory of a pattern needing to be projected, and starts the image sensors, so that the image sensors are in a state of waiting for a triggering command. The digital pattern memory transmits the pattern to the digital pattern projector. The digital pattern projector projects the patterns onto the surface of the object. Within 1 ms after the image projection is completed, the digital pattern projector transmits a pulse signal to the image sensors. The image sensors acquire the patterns which are projected by the digital projecting apparatus onto the surface of the object, and transmit the acquired patterns to the multi-mode digital image processor. After receiving the patterns, the multi-mode digital image processor employs a corresponding feature extraction algorithm to obtain the two-dimensional feature of the surface of the object according to a measuring mode signal transmitted by the controller. The digital image processor transmits the two-dimensional characteristics to the multi-mode digital three-dimensional point cloud calculator. After receiving the two-dimensional characteristics, the three-dimensional point cloud calculator employs a corresponding algorithm to perform the corresponding point searching and the three-dimensional reconstruction according to the measuring mode signal transmitted by the controller, thereby obtaining three-dimensional data of the surface of the object. The three-dimensional point cloud calculator transmits the three-dimensional data of the surface of the object back to the controller, so as to perform displaying, editing and storing, or transmits the three-dimensional data to the external terminal through the communication unit to perform further processing.

When the system needs to update or add a three-dimensional measuring mode, the user can transmit a pattern needing to be updated or added to the digital pattern memory through the communication unit, and can respectively transmit the image processing algorithm and the three-dimensional point cloud calculating algorithm needing to be updated or added to the multi-mode digital image processor and the multi-mode three-dimensional point cloud calculator. After the updating is completed, the digital pattern memory, the image processor and the three-dimensional point cloud calculator return a completion signal, thereby completing the updating or addition of the three-dimensional measuring modes of the system.

The present invention is further described below in detail with reference to drawings and specific embodiments.

Figure 2:
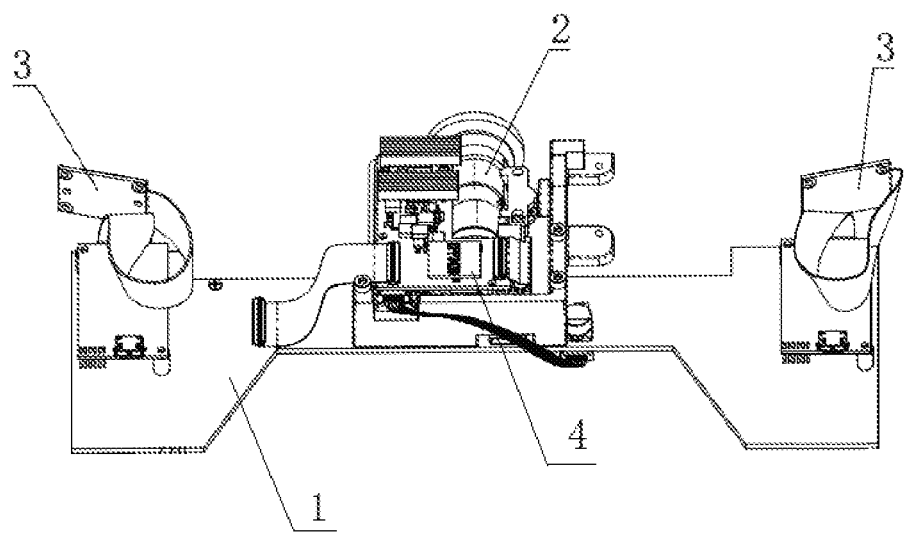
FIG. 2 is a structural schematic diagram illustrating partial units in the embodiment of FIG. 1.

As shown in FIG. 1 and FIG. 2, in a specific embodiment of the present invention, a three-dimensional measuring device with multiple measuring modes includes a device main body, and a circuit board 1, a digital pattern projector 2, image sensors 3, a digital pattern memory 4, a measurement triggering key 5 and a data transmission interface 7 which are inside the device main body, wherein the circuit board 1 is provided with a controller, a multi-mode digital image processor and a multi-mode three-dimensional point cloud calculator. Furthermore, the device main body is provided with a handle 6 for handhold.

When the measuring device in the present embodiment works, after the controller receives a measurement instruction of the measurement triggering key 5, the controller transmits a pulse signal to a variable digital pattern generation unit so as to project a pattern at the current mode, within 1 ms, the controller controls the two image sensors 3 through a triggering signal to synchronously acquire an image of the projected pattern, and the acquired image is processed by the multi-mode digital image processor and the three-dimensional point cloud calculator to generate three-dimensional point clouds.

As shown in FIG. 3 to FIG. 5, the variable digital pattern generation unit in the present embodiment can project various light template patterns including, but not limited to, sinusoidal fringe sequences, digital speckles and parallel-line patterns.

By switching the measuring modes, the three-dimensional measuring device in the present embodiment not only can employ a fixed measuring mode of multiple structured light patterns to implement the high-precision and high-detail three-dimensional measurement for a surface of an object such as an industrial component, a tooth model and a small wooden sculpture, but also can employ a handheld measuring mode of a single picture to implement the rapid and real-time handheld three-dimensional measurement for the surface of the object, such as a human body and a statue.

In order to make the foregoing measuring system capable of implementing the real-time switching of multiple measuring modes, fusing the measured data and implementing the high-detail and high-precision three-dimensional measurement, the present invention also provides a three-dimensional measuring method with multiple measuring modes.

The method is described below in detail:

Firstly, the method employs a uniform data structure to perform data structure management and expression for the measured data.

Specifically, the uniform data structure is used for managing and expressing the measured data obtained at three measuring modes, i.e., the sinusoidal fringe measuring mode, the digital speckle measuring mode and the multi-parallel-line measuring mode, so as to achieve an objective of switching different measuring modes. In a measuring process, a continuous implicit function $D(x)$ is maintained, wherein $x \in R^3$ indicates a position in a three-dimensional space, and $D(x)$ indicates a signed shortest distance from x to the surface of the object. When any measuring mode is used, after a new piece of data is measured, the piece of data is used for changing a value of $D(x)$, so as to achieve an objective of fusing the data. After the measurement is ended, a continuous curved surface indicated by $D(x)=0$ is the surface of the object, obtained by measurement.

As the computer cannot express the continuous data, the $D(x)$ needs to be expressed in a discrete form. In the present embodiment, a boundingbox G is used to surround an area measured by a user, and the boundingbox is used as a feasible domain of $D(x)$. G is uniformly partitioned into small cubes $g_i$ of the same size (if an edge length of G is 512, and the edge size of $g_i$ is 1, $512^3$ small cubes can be obtained). A central point $x_i$ of each $g_i$ records two values $D(x_i)$ and $W(x_i)$ $D(x_i)$ indicates a signed shortest distance from $x_i$ to the surface of the object, and is a positive value when being outside the object and a negative value when being inside the object (as shown in FIG. 6). $W(x_i)$ is an accumulated weight and indicates a confidential level of $D(x_i)$. The greater the $W(x_i)$ is, the more credible the $D(x_i)$ is.

When in initialization, both $D(x_i)$ and $W(x_i)$ are 0. At one measuring mode, after a new piece of data is measured, each point $(P_j, N_j)$ in the data is respectively fused in G, wherein $P_j$ is the three-dimensional coordinate of the point, and $N_j$ is the normal vector of the point.

Firstly, the small cube $g_{Pj}$ where the $P_j$ is placed is found. Preferably, in the present embodiment, only the value of $5^3$ $g_i$ surrounding the $g_{Pj}$ is changed, thus greatly saving the storage space and the calculating time.

For each $g_i$ needing to be changed, the signed distance value $D(x_i)$ and the confidence weight $W(x_i)$ of the distance value are calculated according to the following formula:

$$D(x_i) = N_j \cdot (x_i - P_j)$$

$$W(x_i) = \frac{d_g}{0.1 * d_g + \|x_i - P_j\|^2}$$

wherein $d_g$ is an edge length of $g_i$. A curved surface nearby a point $P_j$ on the surface of the object may be approximately expressed by using a normal plane of the point, so the shortest distance from one point $x_i$ in a space nearby the $P_j$ to the surface of the object may be expressed approximately by using a distance from $x_i$ to the normal plane of the $P_j$. When the distance from $x_i$ to $P_j$ is further, an approximate value of $d(x_i)$ is less accurate, so $w(x_i)$ is inversely proportional to the distance from $x_i$ to $P_j$. In the present embodiment, $w(x_i) \in [10, 0.08]$.

After the measurement is ended, for each $g_i$, a weighted average method may be used to obtain the final $D_f(x_i)$ and $W_f(x_i)$:

$$D_f(x_i) = \frac{\Sigma W_j(x_i) * D_j(X_i)}{\Sigma W_j(x_i)}$$

$$W_f(x_i) = \sum W_j(x_i)$$

wherein $D_j(x_i)$ and $W_j(x_i)$ are values obtained by calculating when the point in multiple pieces of point clouds repeatedly falls in the same $g_i$ at the $j^{th}$ time.

In order to ensure the real-time updating of $D(x)$, the aforementioned formula is changed to an accumulation manner:

$$D^*(x_i) = \frac{W(x_i) * D(x_i) + w(x_i) * d(x_i)}{W(x_i) + w(x_i)}$$

$$W^*(x_i) = W(x_i) + w(x_i)$$

wherein $D(x_i)$ indicates a distance value before being updated, $W(x_i)$ is the confidence weight before being updated, $d(x_i)$ indicates a latest calculated distance value, $w(x_i)$ indicates the latest calculated confidence weight, $D^*(x_i)$ indicates the updated distance value, and $W^*(x_i)$ indicates the updated confidence weight.

In the measurement process or after the measurement is ended, a marching cube method may be used for acquiring point cloud and grid results.

When the data is fused, the normal vector of each point in a single piece of data needs to be known. For the orderly point clouds obtained at the sinusoidal fringe measuring mode and the digital speckle measuring mode, the normal vector is easy to calculate. However, for the linearly distributed point clouds obtained at the multi-parallel-line measuring mode, the normal vector cannot be calculated by only using a single frame of point cloud data. Therefore, in the measuring method of the present invention, the measured data is not fused in the multi-parallel-line measuring process, and is only displayed in a down-sampling manner, so as to instruct the user to measure. When the measurement is ended, all point clouds obtained by measurement are arranged in a uniform global coordinate system, and then the normal vectors of all the point clouds are calculated and finally fused together. In the method of the present invention, the normal vector of each point is analyzed and calculated by using the principal component analysis (PCA) method. A specific formula is as follows:

$$C(p) = \frac{\Sigma q_i}{N}$$

$$M(p) = \sum (q_i - C(p)) \cdot (q_i - C(p))^T$$

wherein p is a point of the normal vector to be calculated, $q_i$ is a point in a specific neighborhood of p, $M(p)$ is a covariance matrix, and an eigenvector corresponding to a minimum eigenvalue is the normal vector of p. Then the direction of the normal vector facing a camera is set as the direction of the normal vector. To search the point in the neighborhood is time-consuming, but the aforementioned uniformly-partitioned data structure is used in the present embodiment to accelerate the search of the point in the neighborhood.

Thereafter, different measured data is merged.

The merging of the point clouds refers to a process of aligning two pieces of point clouds at any positions to the global coordinate system. A complete aligning process is generally divided into two steps: rough aligning and precise aligning. The rough aligning refers to a process of roughly aligning the two pieces of point clouds at any positions. In this scenario, the available rough aligning method includes a manual selection aligning method, a mark point-based aligning method and a feature-based aligning method. The manual selection aligning method refers to a process of completing the rough alignment through the artificial interaction, and is very stable but time-consuming and needs extra workload. For the real-time measuring scenario, the rough aligning cannot be carried out through this way. The mark point-based aligning refers to a method of pasting a mark onto the surface of the measured object so as to instruct the alignment of the point clouds. This method is very stable and fast, but is not available for the measured object on which the mark cannot be pasted (such as the human body, antique and the like). The precise aligning refers to a process of precisely aligning two pieces of roughly-aligned point clouds. A universal precise merging method is an iterative closest point (ICP) method. A basic principle of the ICP method is to iterate and optimize corresponding points in the two pieces of point clouds, so as to make a distance sum of the corresponding points minimum.

If the measured data is not aligned, the measured data cannot be fused, and a measurer user cannot observe the measurement condition (for example, which part is not measured) at any time. The merging process is needed for a first frame after the measuring mode is switched. In other words, a merging main body is the point cloud and a piece of point cloud data extracted from D(x). The mark point-based aligning method, the feature-based aligning method and the manual selection aligning method all are available if switching to the sinusoidal fringe measuring mode. If switching to the digital speckle measuring mode which is a real-time measuring mode, the manual selection aligning method is not available. If switching to the multi-parallel-line measuring mode which is also a real-time measuring mode, the manual selection aligning method is not available. As one frame of data is very small, the feature-based aligning method is not available. Therefore, only the mark point aligning can be used.

Finally, the hybrid global optimization for the measured data is carried out.

The foregoing merging is an optimization process of the current frame and the fused data. If the measured object is excessively large, or the number of frames is large, an accumulated error is extremely easy to generate. The accumulated error influences the overall precision. If a loop exists, large deformation or staggering may occur at a junction of the loop. Therefore, the global optimization process is needed.

At the multi-parallel-line measuring mode, the single-frame data size is very small, so the point cloud information cannot be used to perform the global optimization. The mark point global optimization can organize the data of three models, but also has various problems. (1) As the point cloud information is not used, the optimized local detail is poor; and (2) when the measurement without a mark point is carried out, the method is unavailable.

Based on the above, a hybrid global optimization method of the mark point and the cloud point is used. Firstly, corresponding points of the point cloud and the mark point are searched between every two frames. An error minimization formula is used to obtain rigid variation of each frame of the point cloud. The rigid variation is acted on each frame of point cloud, and this process is iterated until the convergence. The used error formula is as follows:

$$\text{Error}(RT) = \sum_{\text{any two points clouds}(i,j)} \left( w_{i,j}^1 \sum_k \|n_k^T(RT_i * p_k - RT_j * q_k)\|^2 + w_{i,j}^2 \sum_k \|RT_i * P_k - RT_j * Q_k\|^2 \right)$$

wherein $(p_k, q_k)$ is a corresponding point of $(i, j)$, $(P_k, Q_k)$ is a corresponding mark point of $(i, j)$, $n_k$ is a normal vector of $q_k$, and $RT_i$ is a rigid transformation matrix of an $i^{th}$ piece of point cloud. RT is the rigid variation matrix of all point clouds. $w_{i,j}^1$ and $w_{i,j}^2$ respectively are weights of the point cloud corresponding point and the mark point corresponding point. When there is one frame of multi-parallel-line measured data in i, j, set $w_{i,j}^1=0$. When is equal to 0, this algorithm becomes a pure mark point global optimization method. When $w_{i,j}^2$ is equal to 0, this algorithm becomes a pure point cloud global optimization method.

The aforementioned descriptions of embodiments are only used to help to understand the method and the core concept of the present invention. It should be noted that for those skilled in the art, various improvements and modifications can be made to the present invention without departing from the principle of the present invention, and these improvements and modifications fall within the protection scope of claims of the present invention.

What is claimed is:

1. A three-dimensional measuring system comprising:
a projector coupled to a memory for storing a plurality of different structured light patterns to be projected by the projector onto a measured object, the plurality of different structured light patterns corresponding to a plurality of different measurement modes;
an image sensor for sensing light patterns from the measured objected when one of the plurality of different structured light patterns is projected onto the measured object; and
one or more processors configured to at least:
obtain first point cloud data corresponding to a first measurement mode of the plurality of different measurement modes, wherein the first point cloud data is three-dimensional data;
if a second measurement mode is selected, obtain second point cloud data corresponding to the second measurement mode of the plurality of different measurement modes, wherein the second point cloud data is three-dimensional data;
if the second point cloud data is obtained in addition to the first point cloud data, align at least the first point cloud data and the second point cloud data to obtain aligned data by expressing the first point cloud data and the second point cloud data in a common coordinate system and use the aligned data to obtain a three-dimensional measuring result corresponding to the measured object including performing a hybrid global optimization on the aligned data by at least:
  searching corresponding points of the point cloud and a mark point between two frames of the measured data;
  using an error minimization formula to obtain a rigid variation matrix of each frame of point cloud; and
  multiplying the rigid variation matrix by each frame of point cloud, and iterating such a process until convergence; and
  if only the first point cloud data is obtained, use the first point cloud data to obtain a three-dimensional measuring result corresponding to the measured object.

2. The three-dimensional measuring system according to claim 1 wherein the plurality of different structured light patterns comprise a sinusoidal fringes pattern, a digital speckle pattern, and a multi-parallel-line pattern.

3. The three-dimensional measuring system according to claim 1 further comprising a communication unit configured for communicating with an external terminal.

4. The three-dimensional measuring system according to claim 3 wherein the communication unit is adapted to output three-dimensional data of a surface of the measured object and to input updated or added structured light patterns, an image processing algorithm, and a three-dimensional point cloud calculating algorithm.

5. The three-dimensional measuring system according to claim 1 embodied in a hand-held device.

6. The three-dimensional measuring system according to claim 5 wherein the projector is disposed at a front portion of a main body of the hand-held device, the image sensor comprises two image sensors symmetrically disposed on respective different sides of the projector, wherein a rear portion of the main body is provided with a handle or a handheld portion.

7. The three-dimensional measuring system according to claim 1, wherein the alignment of at least the first point cloud data and the second point cloud data comprises a first alignment and a second alignment, the second alignment comprising a more precise alignment of results of the first alignment.

8. The three-dimensional measuring system according to claim 1, wherein different alignment methods are used for aligning point cloud data obtained using different structured light patterns.

9. The three-dimensional measuring system according to claim 1 wherein the error minimization formula comprises:

$$Error(RT) = \sum_{any\ two\ point\ clouds\ (i,j)} \left( w_{i,1}^1 \sum_k \|n_k^T(RT_i * p_k - RT_j * q_k)\|^2 + w_{i,j}^2 \sum_k \|RT_i * P_k - RT_j * Q_k\|^2 \right)$$

wherein $(p_k, q_k)$ is a corresponding point of (i, j), $(P_k, Q_k)$ is a corresponding mark point of (i, j), $n_k$ is a normal vector of $q_k$, $RT_i$ is the rigid transformation matrix of the $i^{th}$ piece of point cloud, RT is a rigid transformation matrix of all point clouds, and $w_{i,j}^1$ and $w_{i,j}^2$, respectively, are weights of the point cloud corresponding point and the mark point corresponding point.

10. The three-dimensional measuring system according to claim 9, wherein when there is one frame of multi-parallel-line measured data in i, j, set $w_{i,j}^1 = 0$.

11. A three-dimensional measuring method with multiple measuring modes, the method comprising:
  establishing a uniform data structural model adapted to uniformly express data obtained in different measuring modes;
  obtaining first point cloud data using a first measurement mode corresponding to a first structured light pattern projected onto a measured object by a projector, wherein the first point cloud data is three-dimensional data;
  obtaining second point cloud data using a second measurement mode corresponding to a second structured light pattern projected onto the measured object by the projector, wherein the second point cloud data is three-dimensional data;
  aligning at least the first point cloud data and the second point cloud data to obtain aligned data by using the uniform data structural model to express the first point cloud data and the second point cloud data in a common coordinate system; and
  using the aligned data to obtain a three-dimensional measuring result corresponding to the measured object;
    wherein using the aligned data comprises performing a hybrid global optimization on the aligned data by performing steps comprising:
      searching corresponding points of the point cloud and a mark point between two frames of the measured data;
      using an error minimization formula to obtain a rigid variation matrix of each frame of point cloud; and
      multiplying the rigid variation matrix by each frame of point cloud, and iterating such a process until convergence.

12. The three-dimensional measuring method according to claim 11 wherein the multiple measuring modes comprise at least one of a sinusoidal fringe measuring mode, a digital speckle measuring mode and a multi-parallel-line measuring mode.

13. The three-dimensional measuring method according to claim 11, wherein the error minimization formula comprises:

$$Error(RT) = \sum_{any\ two\ points\ clouds\ (i,j)} \left( w_{i,j}^1 \sum_k \|n_k^T(RT_i * p_k - RT_j * q_k)\|^2 + w_{i,j}^2 \sum_k \|RT_i * P_k - RT_j * Q_k\|^2 \right)$$

wherein $(p_k, q_k)$ is a corresponding point of (i, j), $(P_k, Q_k)$ is a corresponding mark point of (i, j), $n_k$ is a normal vector of $q_k$, $RT_i$ is the rigid transformation matrix of the $i^{th}$ piece of point cloud, RT is a rigid transformation matrix of all point clouds, and $w_{i,j}^1$ and $w_{i,j}^2$, respectively, are weights of the point cloud corresponding point and the mark point corresponding point.

14. The three-dimensional measuring method according to claim 13, wherein when there is one frame of multi-parallel-line measured data in i, j, set $w_{i,j}^1 = 0$.

\* \* \* \* \*